United States Patent [19]
Polaert et al.

[11] Patent Number: 5,447,074
[45] Date of Patent: Sep. 5, 1995

[54] STRAIN GAUGE TRANSDUCER FORCE OR WEIGHT MEASUREMENT ARRANGEMENT AND TOUCH TABLET

[75] Inventors: Rémy Polaert, Villecresnes; François Maniguet, Marles En Brie, both of France

[73] Assignee: U.S. Philips Corporation, New York, N.Y.

[21] Appl. No.: 358,637

[22] Filed: Dec. 19, 1994

Related U.S. Application Data

[63] Continuation of Ser. No. 135,767, Oct. 12, 1993, abandoned.

[30] Foreign Application Priority Data

Nov. 18, 1992 [FR] France .................. 92 13856

[51] Int. Cl.⁶ .................................. G01B 7/16
[52] U.S. Cl. ........................ 73/862.041; 73/763
[58] Field of Search ............. 73/763, 781, 755, 862.04

[56] References Cited

U.S. PATENT DOCUMENTS

| | | | |
|---|---|---|---|
| 3,512,595 | 5/1970 | Laimins | 177/187 |
| 3,986,254 | 10/1976 | Nordstrom | 29/613 |
| 4,526,043 | 7/1985 | Boie et al. | 73/862.04 |
| 4,658,651 | 4/1987 | Le | 73/708 |
| 4,712,628 | 12/1987 | Van Den Brug | 177/211 |
| 4,793,193 | 12/1988 | Borgudd | 73/862.04 |

FOREIGN PATENT DOCUMENTS

| | | |
|---|---|---|
| 1173830 | of 0000 | France . |
| 2424523 | 4/1978 | France . |
| 2608759 | 6/1988 | France . |
| 8908822 | 9/1989 | WIPO . |

Primary Examiner—Richard E. Chilcot, Jr.
Assistant Examiner—James M. Olsen
Attorney, Agent, or Firm—Paul R. Miller

[57] ABSTRACT

A strain-gauge transducer (5) comprising a substrate (10) provided with strain gauges and pressure members (11, 12) which deform the substrate (10) via transfer elements (1a, 4a) which transmit an applied force (F). The transfer elements comprise bars (1a, 1b, 4a, 4b) molded from an elastomer in a common molding operation. A material (2a, 3a) having a higher compressibility than the bars may be interposed between the bars. This material may form elastic stops (54a) provided to preclude breakage of the substrate. This results in a transducer whose sensitivity is linear for small loads and which is very insusceptible to overloading. The transducer can be used for the construction of scales or touch tablets.

15 Claims, 4 Drawing Sheets

STRAIN GAUGE TRANSDUCER FORCE OR WEIGHT MEASUREMENT ARRANGEMENT AND TOUCH TABLET

This is a continuation of application Ser. No. 08/135,767, filed on Oct. 12, 1993, now abandoned.

BACKGROUND OF THE INVENTION

The invention relates to a strain-gauge transducer comprising at least one strain gauge disposed between two pressure members which deform the strain gauge under the influence of an applied force, said strain gauge having a substrate provided with strain detectors and transfer means comprising segments of an elastic material between the substrate and the pressure members to transmit the applied force.

The invention also relates to force or weight measurement arrangement using such a transducer, and to a zone-access touch tablet or a touch-sensitive writing or signature tablet.

A strain-gauge transducer generally comprises a substrate carrying resistive elements whose resistance values vary with the deformations to which the substrate is subjected under the influence of the applied forces.

The characteristics of a transducer are defined by:
its sensitivity, which should be as high as possible,
its linearity as function of the load,
absence of fatigue, hysteresis, or breaking under high loads,
its production costs, which should be low for large-scale uses.

In order to ensure that the weight or force measurement is linear and accurate the support which is used should have reproducible and linear mechanical properties. This is an advantage of gauges formed by a ceramic plate on which a resistive ink has been deposited by screen-printing. Indeed, the ceramic plate has a very large elasticity range, which is limited only by the breaking point of the ceramic plate itself. There is neither plastic deformation nor hysteresis.

On the other hand, a strain-gauge transducer is mainly intended for use in consumer applications, for example in scales or in force transducers of all kinds. The technologies used should therefore be free from the restraints associated with large series, in particular spreads of mechanical tolerances of the parts, which may lead to assembly problems and even to breakdown of the transducer.

The document FR 2,608,759 describes a weighing apparatus comprising a deformable plate carrying strain gauges disposed between pressure members formed by a base at the bottom and a panel at the top. The deformable plate is in contact with the pressure member by means of knife edges of an elastic material, for example of rubber. The knife edges are positioned by means of recesses in the pressure members and in the deformable plate. These recesses are formed by cutting or stamping, which implies a fairly low positioning accuracy. During assembly the rubber knife edges must be fitted into these recesses and must be positioned relative to the other one of the pressure members and the deformable plate.

This gives rise to mounting problems, particularly as a result of incorrectly machined substrates.

The inaccuracies as regards the positions of the knife edges cooperating with each element and as regards the distances between the plate and the pressure members concur, resulting in a force measurement with only a low precision.

For this reason, this type of weighing apparatus is mainly used for bathroom scales.

SUMMARY OF THE INVENTION

It is the object of the invention to mitigate these problems so as to obtain a transducer having the above-mentioned characteristics.

This object is achieved with a transducer in which the segments are positioned and dimensioned by molding the elastic material in a common molding operation.

Thus, all the segments are positioned and dimensioned in a single molding operation, which has the advantage of a very high accuracy (that of the die) and a high reproducibility and facilitates assembly and production.

Preferably, a substrate in the form of a ceramic blade is used. Despite irregularities of the blade surfaces the plurality of supporting points can be positioned regularly on the blade in an accurate manner and so as to be reproducible from blade to blade, in order to facilitate production. The use of molded supporting points on the blade results in low production costs and a transducer with reproducible and exact characteristics. Its operation is linear as a function of the applied load. Moreover, the substrate is fixedly connected to the two pressure members.

Preferably, an S-curvature is used for the ceramic blade to increase the sensitivity. The strain detectors can be arranged on the same blade surface. As a result of this plurality of contact points the influence of irregularities could become more annoying and lead to malfunctioning or to breakage of the substrate. This problem can be overcome by the use of an elastic material for realizing said plurality of supporting points. Another curvature of the blade is possible.

The space left between each pressure member and the blade may be filled with a material having a higher compressibility than the contact segments. The thickness of the high-compressibility zones can be adjusted so as to limit movements of the substrate in these zones and thereby prevent the substrate from breaking when its elastic limits are overstepped. The presence of a multiplicity of zones having different compressibilities enables the substrate to be in contact in certain zones and to be movable more freely in the other zones. The first and the second compressibility can be obtained either by means of two different elastic materials or by means of one elastic material of different thicknesses.

These and other aspects of the invention will become apparent from and will be elucidated on the basis of the embodiments described hereinafter.

BRIEF DESCRIPTION OF THE INVENTION

The invention will be more fully understood with the aid of the following drawings given by way of non-limitative example and in which.

DETAILED DESCRIPTION OF THE INVENTION

Figure 1A:
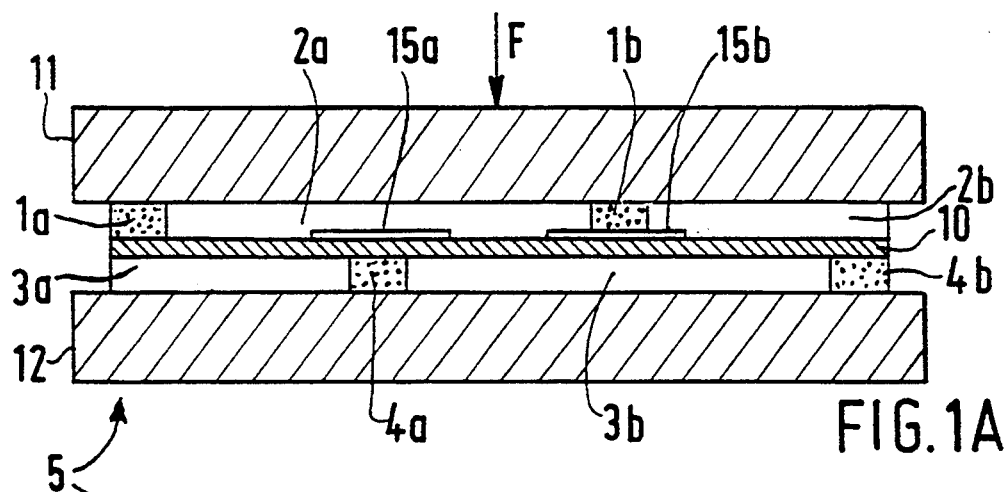
FIG. 1 is a diagram showing a sectional view A and a perspective view B of a transducer in accordance with the invention in a state of rest.
Figure 1B:
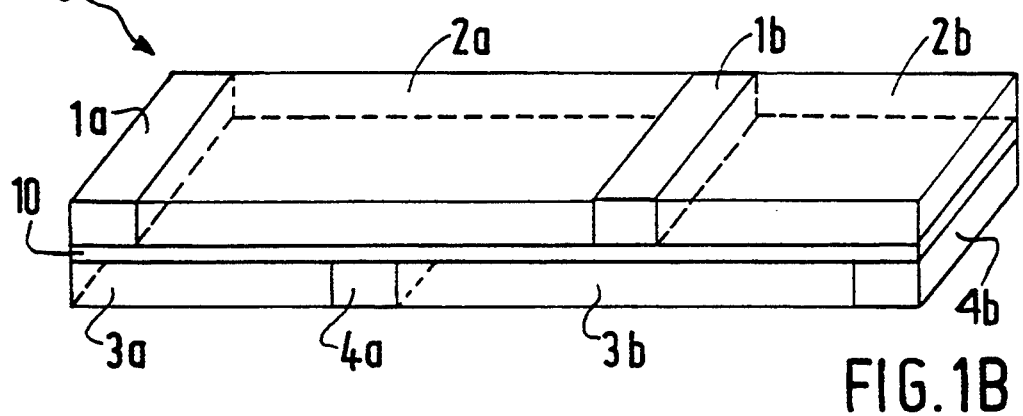

FIG. 1 shows diagrammatically a transducer 5 comprising a substrate, preferably a blade 10, which is pressed between two pressure members 11, 12 under the influence of an applied force F. FIG. 1 illustrates the state of rest of the strain gauge. The drawing is not to scale. In FIG. 1-B the pressure members are not shown. The deformations of the strain gauge are detected by strain detectors 15a, 15b. The thickness of these detectors has been exaggerated. In accordance with the invention the transfer means for transmitting the applied force are disposed on each side of the blade 10. These means comprise first zones 1a, 1b; 4a, 4b having a low compressibility and second zones 2a, 2b; 3a, 3b having a higher compressibility and contributing little to the force transmission. Preferably, the low-compressibility zones are bar-shaped and extend perpendicularly to the longitudinal direction of the blade. The deformation of the blade 10 is defined by the active and reactive forces applied by the bars 1a, 1b, 4a, 4b, whose compressibility is lower than that of the adjacent zones.

Figure 2:
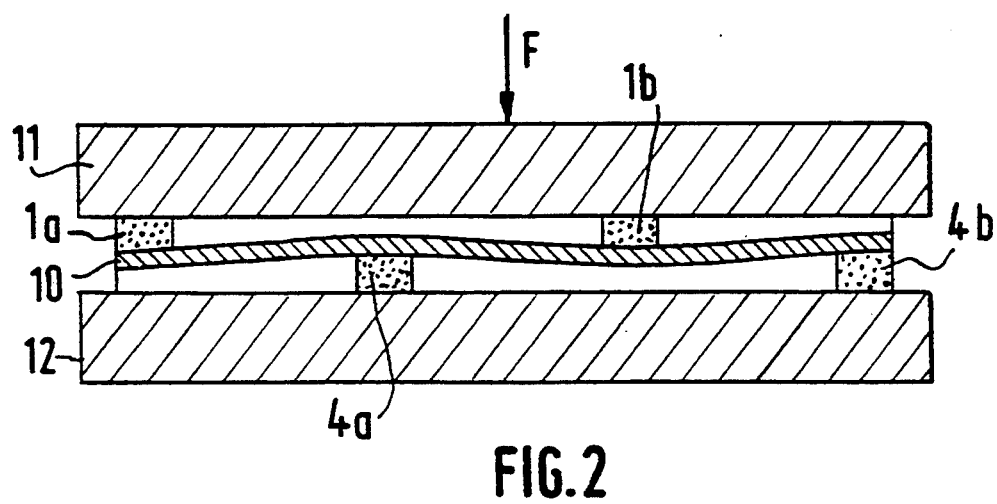
FIG. 2 is a sectional view showing the transducer in FIG. 1 when a force is applied.

FIG. 2 shows diagrammatically a blade which has been subjected to an S-like deformation under the influence of the applied force F. By making said bars of a flexible material, for example an elastomer or rubber or any other similar elastic substance, it is possible to provide a plurality of points of support on the substrate in spite of surface irregularities or irregular machining of this surface. A precise positioning of these bars can be achieved by moulding the elastic material on the substrate. The elastic material may adhere to the substrate or may be glued thereto. Since the bars are permanently in contact with the pressure members it is possible to glue these bars onto these pressure members, so that assembly is possible without the use of clips, screws or other mechanical fasteners.

This fixing method using adhesive elastomer bars yields the following advantages:
- the pressure members are fastened to the pressure gauge or gauges,
- the strain transmitted by the elastomer is distributed smoothly and uniformly,
- mechanical hard spots are avoided,
- possible vibrations are damped,
- low-cost mechanized production is possible.

The high-compressibility material may be formed by another elastomer or rubber enabling adhesion and fastening of the bars. It is also possible to use air. The high compressibility can also be obtained by introducing air bubbles into the material.

Figure 3A:
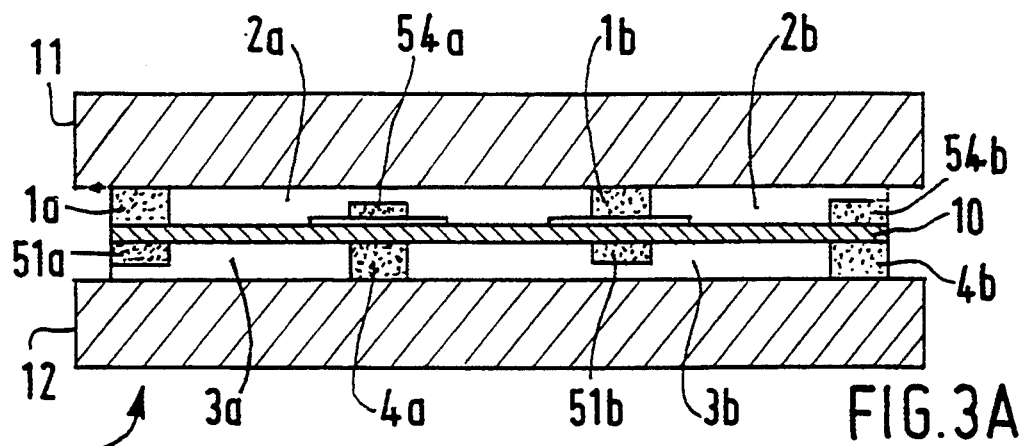
FIG. 3 shows two views A, B of the transducer in FIG. 1 with stops to limit movements of the substrate.
Figure 3B:
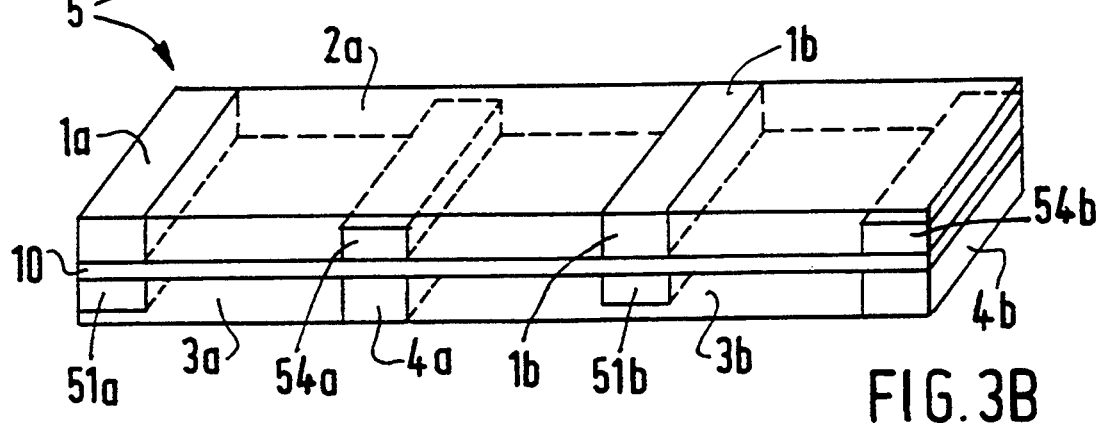

FIG. 3 shows diagrammatically a transducer of the same type as that in FIG. 1, in which the high-compressibility zones have been provided with stops 51a, 51b, 54a, 54b which limit the movements of the blade 10 in these zones. The pressure members are not shown. The stop 51a and the element 1a are disposed on opposite sides of the blade. This also applies to the other stops 51b, 54a, 54b. The thicknesses of the stops 51a, 51b, 54a, 54b can be tailored so as to achieve that the blade, as it is deflected, cannot reach its breaking point.

Preferably, the stops 51a, 51b, 54a, 54b are made of the same material as the bars 1a, 1b, 4a, 4b. This is not essential but it has the advantage that all these elements can be formed in the same moulding operation. A correct positioning and reproducible characteristics are thus guaranteed.

Figure 4:
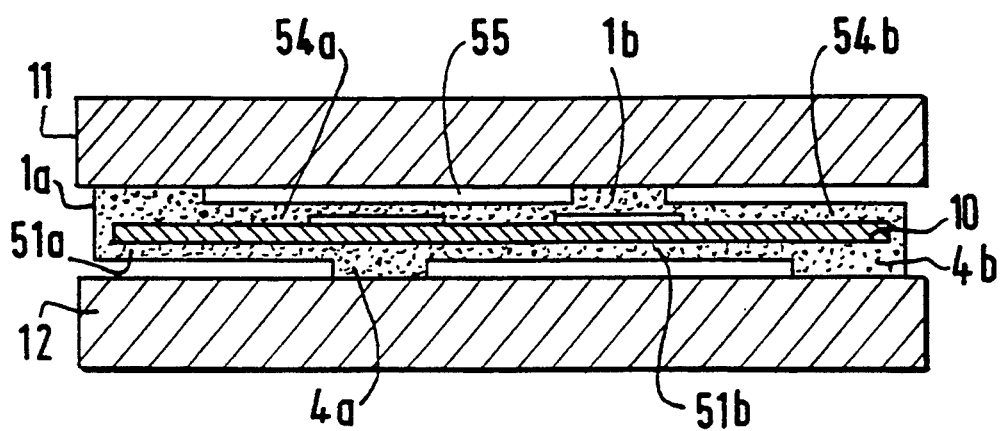
FIG. 4 is a sectional view of the transducer in FIG. 1 with a single force-transfer means obtained by moulding.

FIG. 4 shows diagrammatically an embodiment in which the bars and the stops are formed in a single moulding operation. During assembly air inclusions 55 are maintained. The elastic material thus molded forms both the bars and the stops and also fastens all the parts relative to one another. This solution is very suitable for large-scale production at low cost.

Figure 5A:
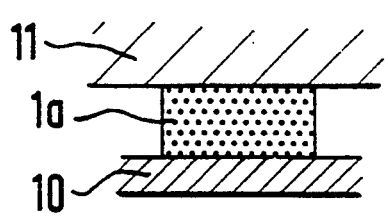
FIG. 5 shows two sectional views A, B illustrating two methods of forming zones of different compressibilities.
Figure 5B:
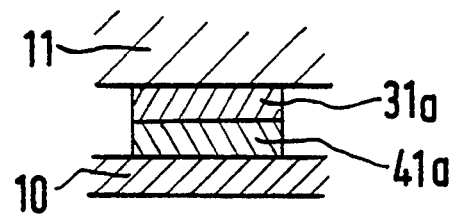

Alternate zones of different compressibility can be obtained through the nature of the material or by stacking different materials. Thus, bars or stops may be formed from a single material 1a (FIG. 5-A) or from two or more materials 31a, 41a of different compressibilities (FIG. 5-B). For example, the material 41a is an elastomer and the material 31a is a hard material. The combination of materials 31a, 41a gives a lower apparent compressibility than the elastomer alone. The hard material 31a may be formed by a protuberance into the pressure member or into the blade.

In a practical embodiment the elastic bars were moulded from an elastomeric material (Sylgard). Molding was effected after previous application of a priming coat to the ceramic material to ensure a correct adhesion. Conversely, adhesion to the mould was avoided by means of a liquid based on polytetrafluoroethylene.

In this embodiment (FIG. 3-B) 2 bars and 2 stops were arranged at opposite sides of a ceramic blade. The bars and stops all had the same width (i.e. 2 mm) and the same length (i.e. 10 mm) equal to the width of the ceramic blade but they had two different thicknesses. The bars had a thickness of 1 mm and the stops had a thickness of 0.85 mm.

Thus, the strain gauge with its bars and stops is mounted at rest between flat pressure members, only the bars being in contact with the pressure members. When a force F is applied the bars deform the gauge into an "S".

Figure 6A:
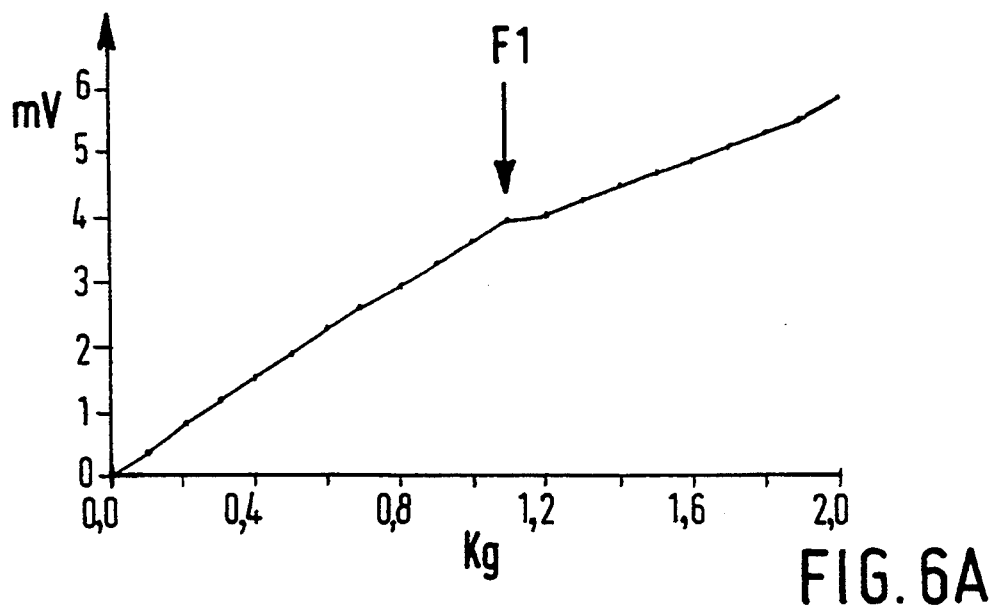
FIGS. 6A–6B show two waveforms of measurement signals supplied by the strain detectors as a function of the applied load.
Figure 6B:
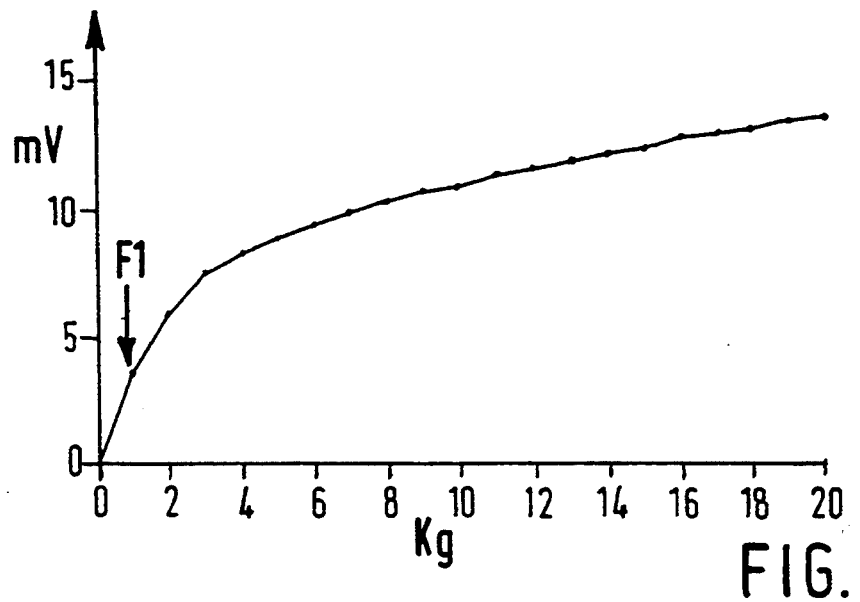

The characteristic is perfectly linear up to a certain value, in the present case $F_1$ (FIG. 6-A). Above this value the compression of the bars and the (generally low) "S" deformation of the ceramic element become such that the stops also come into contact with the surface of the pressure members. The characteristic gradually incurves and the sensitivity decreases (FIG. 6-B). This incurvation of the characteristic results in a non-linearity which is very advantageous:

1) it prevents breakage of the ceramic element in the case of overloading and it provides protection from shocks,
2) it makes it possible to obtain a large measurement range with a high sensitivity to small loads,
3) saturation is gradual and, consequently, the measurement can proceed in the non-linear part provided that this non-linear part (in the present example up to 20 kg) has been calibrated (FIG. 6-B).

Such a transducer can be used to construct weighing scales or a force-measurement arrangement.

Such a transducer can also be used to construct zone-access touch tablets of small thickness or touch-sensitive writing or signature tablets.

Figure 7A:
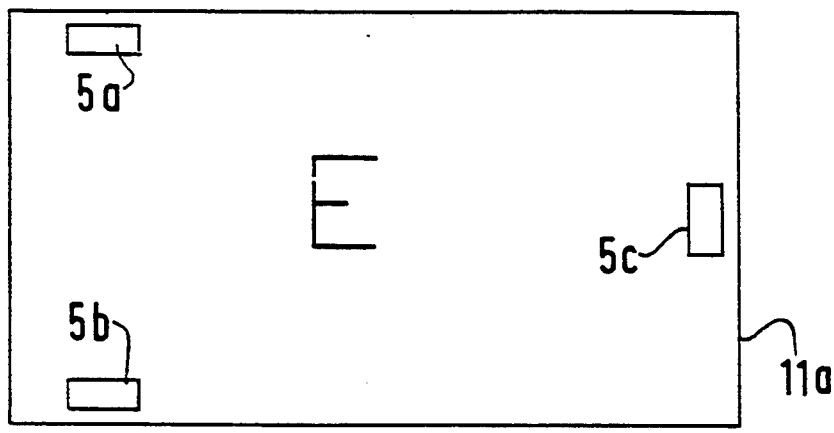
FIG. 7 shows a plan view A and a sectional view B of a writing tablet.
Figure 7B:
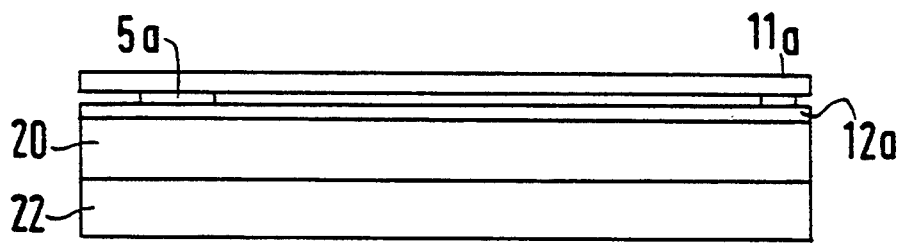

FIG. 7 shows diagrammatically a plan view A and a sectional view B of a writing tablet. It comprises, by way of example, three transducers 5a, 5b, 5c arranged in a triangle between a pressure member formed by an entry panel 11a and a pressure member formed by a screen 12a of a display 20. By gluing the three transducers to the panel 11a and to the screen 12a a table of small thickness is obtained without fixing straps or clips. This tablet can be manufactured easily. Thus, the tablet has transducers which are robust and whose sensitivity is initially linear for small applied forces and subsequently non-linear for large applied forces. This ensures that the tablet has a large dynamic range for the range of applied forces and is protected from breaking as a result of overloading.

In another version (FIG. 8) the touch tablet can be organized in access zones Z1, Z2, Z3 . . . indicated on the entry panel 11a, on which the user exerts pressure to enter commands. The zones are situated opposite a menu appearing on the display screen. A calculator 22 processes the signal produced by the strain gauges. The zones and the menu may also be indicated on the display screen or only on the entry panel.

Figure 8:
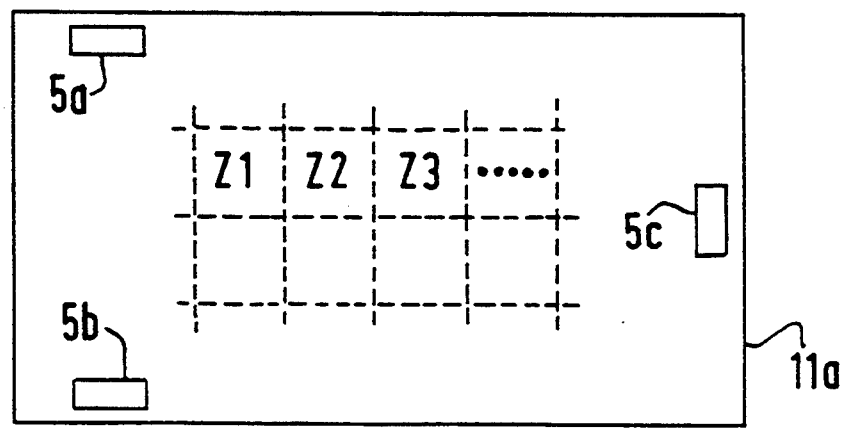
FIG. 8 is a plan view of a zone-activated touch tablet.

If the transducer is used to form, for example, a weighing instrument or a force detector one transducer or a plurality of transducers may be employed depending on whether the dimensions of the weighing instrument or the force detector should be small or large. If a plurality of transducers is used an arrangement as shown in FIG. 8 is suitable.

We claim:

1. A strain-gauge transducer, comprising:
   two pressure members which are deformable in response to an applied force;
   at least one strain gauge having a substrate disposed between the two pressure members; and
   a plurality of strain detectors and transfer means comprising segments of an elastic material integrally molded to the substrate and located between the substrate and the pressure members to transmit the applied force.

2. A transducer as claimed in claim 1, wherein the segments are alternately disposed at opposite sides of the substrate.

3. A transducer as claimed in claim 1, wherein opposite each segment, on the surface opposite to that where it is situated, a stop is disposed to limit the deflection of the substrate.

4. A transducer as claimed in claim 3, wherein the stop is made of an elastic material.

5. A weight or force measurement arrangement, wherein it includes at least one transducer as claimed in claim 1.

6. A strain-gauge transducer, comprising:
   at least one strain gauge including a substrate;
   a strain detector in contact with a side of the substrate;
   two pressure members each one of which is disposed adjacent an opposing side of the substrate which deform the strain gauge under the influence of an applied force;
   transfer means disposed between each said pressure member and the substrate for transmitting the applied force, including segments of an elastic material molded on the substrate in a single molding operation for positioning and dimensioning said segments on the substrate; and
   a stop attached to an opposite surface of the substrate that the segment is molded to and located opposite the segment, having a higher compressibility than an adjacent segment, to limit the deflection of the substrate.

7. A transducer as claimed in claim 6, wherein the higher compressibility of the stop is obtained by forming air chambers in the elastic material during molding.

8. A strain-gauge transducer, comprising:
   at least one strain gauge including a substrate;
   a strain detector in contact with a side of the substrate;
   two pressure members each one of which is disposed adjacent an opposing side of the substrate which deform the strain gauge under the influence of an applied force;
   transfer means disposed between each said pressure member and the substrate for transmitting the applied force, including segments of an elastic material molded on the substrate in a single molding operation wherein the segments are positioned and dimensioned during the single molding operation for positioning and dimensioning said segments on the substrate; and
   a stop attached to an opposite surface of the substrate that the segment is molded to and located opposite the segment wherein the stop is positioned and dimensioned during the single molding operation.

9. A touch tablet, comprising:
   at least one transducer including
      two pressure members which are deformable in response to an applied force;
      at least one strain gauge having a substrate disposed between the two pressure members; and
      a plurality of strain detectors and transfer means comprising segments of an elastic material integrally molded to the substrate and located between the substrate and the pressure members to transmit the applied force.

10. A method for producing a strain gauge transducer, comprising the steps of:
   positioning and dimensioning a plurality of strain detectors and transfer means comprising segments of an elastic material on a surface of a substrate by molding the elastic material on the substrate in a single molding operation; and
   disposing at least one strain gauge including the substrate between two deformable pressure members.

11. The method of claim 10 in which the step of positioning and dimensioning the strain detectors and transfer means on a surface of a substrate comprises alternately disposing the segments on opposing surfaces of the substrate.

12. The method of claim 10 further comprising the step of disposing a stop on the surface of the substrate opposite each segment to limit a deflection of the substrate due to an applied force.

13. The method of claim 12 wherein disposing a stop on the surface of the substrate comprises disposing a stop having a compressibility that is higher than a compressibility of the segment adjacent the stop.

14. The method of claim 12 wherein disposing a stop having a compressibility that is higher than a compressibility of the segment adjacent the stop comprises forming an air chamber in the elastic material during the single molding operation.

15. The method of claim 12 wherein disposing a stop on the surface of the substrate comprises positioning and dimensioning the stop in the single molding operation of positioning and dimensioning the strain detectors and transfer means.

* * * * *